2,824,028

USE OF MAGNESIUM CARBONATE TRIHYDRATE IN A PRELIMING CARBONATION PROCESS

Alexander M. Zenzes, New York, N. Y.

No Drawing. Application January 26, 1954
Serial No. 406,355

Claims priority, application Germany August 28, 1953

3 Claims. (Cl. 127—56)

The present invention relates to a process for the purification of cane and beet juice and the like which eliminates the conventional double carbonation customary in the beet sugar industry. The process provides corresponding advantages in the purification of cane juice.

Thus, the present process makes it possible to effect an improved defecation of beet juice without applying the high, harmful alkalinity now customary throughout the industry.

The present process merely requires mild preliming followed by a novel method of carbonating the prelimed juice at low alkalinity while a complementary defecation effect is taking place due to the simultaneous action of magnesium hydroxide in statu nascendi. The process requires less lime than conventional methods and yields juices of improved quality while at the same time simplifying the processing of the juice.

The process is based upon the discovery that reactive magnesium hydroxide, if reacting at definite pH levels on prelimed juice in statu nascendi, will produce a complementary purification and conditioning effect which surpasses that normally achieved by conventional liming and first carbonation at high alkalinities. The present process is illustrated further below in its application to the beet sugar industry, it being understood that it applies, with proper modifications, to the processing of cane juice, sorghum juice, raw sugars from cane and beet, syrups, molasses and the like.

The term "reactive" magnesium carbonate trihydrate as used hereinafter and in the claims annexed hereto refers to a magnesium carbonate trihydrate which releases carbon dioxide instantaneously on reaction with calcium oxide or hydroxide. Such a reactive magnesium carbonate trihydrate is obtained, as described hereinafter, by burning dolomite, magnesite, and the like magnesium carbonate-containing material, slurrying said burnt material with water and introducing into the slurry carbon dioxide at a temperature below about 60° C. whereby the concentration of the slurry is between about 10% and about 15% of said burnt dolomite, magnesite, and the like.

One of the disadvantages of the double carbonation process, particularly in the beet sugar industry, is the high consumption of lime which in turn requires the operation of a lime kiln for the processing of large tonnages of lime stone. Some factories use as much as 2% CaO on beet.

The present process makes it possible to obtain better juice purification and better filtration while at the same time reducing the requirements of lime merely to the small quantity necessary for preliming. That quantity amounts to approximately one fourth of the total, that is about 0.5% CaO on beet. Thus, it is possible to operate a sugar factory without lime kiln, if desired. The requirements of $CO_2$ of the present process are conveniently satisfied by the available flue gas.

The present process relies for the carbonation and complementary purification effect upon a novel, highly reactive form of magnesium carbonate, preferably the magnesium carbonate trihydrate $MgCO_3 \cdot 3H_2O$.

The use of such reactive carbonate and the preparation thereof is described in a copending application. Said application relates to the improvement of the conventional carbonation process by the use of such carbonate. The present invention, however, refers to a further improvement whereby conventional first carbonation is completely eliminated and the use of lime is limited to what is known in the art as preliming.

The novel carbonating and refining agent shown herein reacts instantly with available calcium ions in prelimed use in such a manner as to produce a carbonating effect upon the juice while releasing magnesium hydroxide in statu nascendi. Such juice, contrary to all previous concepts of the art is excellently filterable and as will be shown below, is superior in other respects to juice purified in the conventional manner at high pH.

It was found that the complementary purification effect obtained by the nascent $Mg(OH)_2$ on prelimed juice at about pH 10.8 equals or surpasses the purification effect obtained by conventional liming to pH 12 plus first carbonation to about pH 10.8 Evidently, a small quantity of MgO, for instance 0.1% on beet, if employed in accordance with the present invention will produce more desirable purification than 10 times the amount of lime or even 10 times the amount of MgO, if the latter is not used in the reactive form as shown herein.

It will be shown that the novel reactive magnesium carbonate if employed within the critical limits of temperature and pH, will not only supply the desired complementary refining effect but will simultaneously release sufficient $CO_2$ for the carbonation of the prelimed juice. Hence, the function of the lime kiln becomes practically superfluous.

The above mentioned copending application describes the four-fold effect obtained by the reactive magnesium carbonate polyhydrate in the conventional process of double carbonation. It was shown, how a relatively small quantity of highly active $Mg(OH)_2$ in statu nascendi improves a juice previously exposed to the conventional high lime treatment at pH 12 and conventional first carbonation. The four-fold improvement refers to improvement in purity, in colour, in removal of lime salts and improved filterability.

It was now found that the same high degree of juice purification is produced, if the process is applied to prelimed juice thereby eliminating entirely the conventional high lime defecation and carbonation. Prelimed juice as such is not satisfactorily filterable nor is it sufficiently purified. However, the cleaning and conditioning effect of the magnesium hydroxide in statu nascendi renders prelimed juice filterable to a degree which surpasses even the filtration velocity of conventional first carbonation juice.

The double effect of releasing nascent $CO_2$ for the purposes of carbonation and releasing freshly precipitated $Mg(OH)_2$ for purposes of refining takes place according to the following typical reaction:

$$Ca + MgCO_3 \cdot 3H_2O = CaCO_3 + Mg(OH)_2 + H_2O$$

The reactive magnesium carbonate is added preferably as aqueous suspension at the end of preliming, preferably at pH 10.8 and in sufficient quantity to carbonate the juice down to less than pH 10.0, preferably about pH 9.6. The reaction requires about 1–3 minutes. Thereafter, a contact period is provided in order to permit the precipitated magnesium hydroxide to exercise its full refining action which is due in part to adsorption of colour and non-sugars. Thereafter any dissolved MgO is removed by adding a quantity of complementary lime, sufficient to raise the pH again to a value higher than pH 10.0, preferably about 10.2 to 10.4.

The purpose of complementary liming is the removal of dissolved MgO which is substantially insoluble at a pH higher than 10.0. In fact, the small amount of magnesium hydroxide thus precipitated exercises an additional refining effect. Conventional activated MgO may also be used permitting the full development of its refining action. Then, instead of lowering the pH by the addition of acids, forming insoluble salts, the present invention provides for the addition of complementary lime for the removal of dissolved MgO followed by carbonating the filtrate down to the desired endpoint:

Mg+alkalinity higher than about 10.2 = Mg(OH)$_2$

Previous attempts of the prior art to employ magnesium carbonate were not successful. Precipitated magnesium carbonate known as magnesia alba is uneconomical for the sugar industry. The natural form of MgCO$_3$, as in magnesite or dolomite is not reactive under conditions prevailing in limed sugar juices.

Furthermore, the prior art has not recognized the critical pH levels shown in the present invention followed by the complementary liming step. In fact, where the prior art shows the use of magnesium carbonate it does nowhere attempt to defecate without going through the conventional high liming operations followed by first and second carbonation.

The reactive magnesium carbonate polyhydrate of the present invention is preferably used in the form of an aqueous suspension and is made by recarbonating calcined dolomite, calcined magnesite or other magnesium oxide, preferably below a temperature of 60° C. At a temperature higher than 60° C. the suspension of the reactive carbonate loses about 20% CO$_2$ which is thus lost for purposes of carbonation of the juice.

$$5MgCO_3.3H_2O \xrightarrow[plus]{60° C.} 4MgCO_3.Mg(OH)_2.4H_2O + 10H_2O + CO_2$$

In other words, the trihydrate or the penta hydrate is the preferred form of reactive magnesium carbonate for the purposes of the present invention.

It is an object of the present invention to provide a simplified and improved purification of cane and beet juice, preferably beet juice, with substantially reduced consumption of lime and without applying the conventional first carbonation.

It is a further object to provide a new carbonating agent for cane and beet juice in the form of magnesium carbonate polyhydrate which releases CO$_2$ for carbonation and magnesium hydroxide for refining action.

It is a further object to make dolomite, magnesite and the like available to the sugar industry as a source of improved raw material for the purification and refining of sugar juices, syrups, raw sugar solutions and the like.

The following are typical examples of the application of the process as it relates to the making of reactive magnesium carbonate and to the purification of juice without conventional double carbonation.

EXAMPLE NO. 1

*Preparation of a reactive magnesium carbonate by recarbonation of dolomite*

200 g. half burnt ground dolomite, containing 25% MgO are suspended in 2 liters of water. Thin juice or sweet water may be employed in lieu of water.

40 liters of CO$_2$ are diluted with air to produce a mixture containing about 12% CO$_2$. This mixture is preferably used to simulate flue gas which is preferably employed on a commercial scale where a factory is operating on the process without conventional lime kiln.

The mixture of CO$_2$ is added gradually to the aqueous suspension while agitating, care being taken to cool, if necessary, to less than 50° C. in view of the solubility of magnesium carbonate trihydrate.

The completion of the reaction may be observed by means of a microscope which shows the typical needle shaped crystals of MgCO$_3$.3H$_2$O, having a length of 30–50 microns.

The degree of recarbonation may be checked by reacting a given weight of the reconstituted dolomite with lime water.

A small amount of the original MgO, equivalent to about 0.5 mol MgO per liter is dissolved as bicarbonate which, however, is subsequently precipitated as active Mg(OH)$_2$ in the juice. The reactions taking place are illustrated as follows:

(1) $\quad MgO + 2CO_2 + H_2O = Mg(HCO_3)_2$ (2) $\quad Mg(HCO_3)_2 + 2H_2O \xrightarrow{<60° C.} MgCO_3.3H_2O$ or (3) $\quad Mg(HCO_3)_2 + MgO + 5H_2O = 2MgCO_3.3H_2O$ The foregoing example is not limited to half burnt dolomite. In fact, an improved result is obtained by reconstituting to the desired polyhydrate form a hydrated dolomitic lime made by hydrating dolomite previously burnt at about 900 to 1000° C. The same alternative applies to magnesite previously calcined until substantial removal of CO$_2$.

Excellent results were also obtained with trihydrate slurry from carbonated seawater MgO. The slurry of reactive carbonate prepared as above is a substantially white, viscous liquid which is readily pumped and proportioned at the point of contact with the prelimed juice.

EXAMPLE NO. 2

*Recarbonation of calcined magnesite*

Magnesite ore is calcined at about 750° C. for the substantial removal of CO$_2$. This CO$_2$ may be subsequently used for the recarbonating step if desired.

100 g. of such MgO are finely ground and suspended in 2 liters of water of juice.

60 liters of CO$_2$ are added while agitating slowly and while keeping the temperature below 60° C. The carbonation is continued until substantially all, or at least 85–95% of the available MgO are converted to MgCO$_3$.3H$_2$O.

A special application of the present invention provides for the recarbonation of the MgO containing raw material in all or a portion of the raw juice.

EXAMPLE NO. 3

*Preliming carbonation with reactive carbonate*

800 cc. of raw beet juice of 14° Brix are progressively prelimed by the addition of milk of lime of 23° Baumé. The temperature is kept below 60° C. The preliming is preferably carried out progressively over a period of about 25 minutes with or without the addition of CO$_2$, until a pH of about 10.8 is reached. A total of about 0.4% CaO is required for this purpose, calculated on beet. This amount is increased slightly to about 0.5% to 0.6%, if CO$_2$ is added during the preliming stage.

The preliming is preferably carried out in continuous automatic preliming equipment.

The prelimed juice is heated to above 80° C. while the reactive magnesium carbonate is added, as previously prepared according to Example 1 or 2, respectively.

For the purpose of the present example 42 cc. of a 10% slurry are added, made from half burnt dolomite having a mol ratio 1:1 which was prepared in accordance with Example No. 1.

The carbonating effect of the slurry caused a rapid drop in pH to 9.6. Simultaneously, a visible improvement in colour took place due to the action of the liberated Mg(OH)$_2$.

While the carbonating effect is practically instantaneous, the refining effect is a function of time and the color and purity improvement proceeds with prolonged contact. The preferred contact period for the completion of the reaction of the magnesium hydroxide is 10 to 15 minutes.

Thereafter, milk of lime was added to pH 10.2 for the removal of dissolved MgO. The juice was filtered and showed 32% improvement in filtration rate as compared to conventional first carbonation procedure. The color of the filtrate showed an improvement of 29% above conventional first carbonation juice.

The filtrate was subsequently saturated to pH 8.8.

Table I shows the typical improvement resulting from the present process of preliming carbonation. The column B corresponds to the conditions of the present Example No. 3 and the column C shows the additional improvement resulting from the use of reactive magnesium carbonate slurry made from burnt magnesite instead of from half burnt dolomite.

TABLE I

|  | A | B | C |
|---|---|---|---|
| Filtration rate (seconds) | 180 | 122 | 64 |
| Calcium salts | 37 | 19 | 8 |
| Color (specific extinction) | 15 | 10.5 | 6 |
| Apparent purity | 92.5 | 92.9 | 93.2 |

A = Progressive preliming to pH 10.8; main liming to pH 12; saturation with $CO_2$ to pH 10.8.
B = Preliming carbonation according to Example No 3; magnesium carbonate slurry from dolomite.
C = Preliming carbonation according to Example No 3; magnesium carbonate slurry from magnesite.

The thick juice resulting from this process is superior in quality to thick juice resulting from conventional first and second carbonation.

The process illustrated in the foregoing examples may be varied by those versed in the art without departing from the scope of the invention.

From the foregoing detailed description it will be readily understood that 2 g. of ground natural magnesium carbonate if added to a liter of prelimed juice at about pH 10.8 will not produce the desired results.

It will also be clear that the addition of the components of said magnesium carbonate at pH 10.8, that is the separate addition of MgO and $CO_2$ will not necessarily produce the desired results. However, by first separating the natural carbonate into the two components and then reuniting them again in the presence of water as directed and using the new product as described I obtained the new and useful results.

The process avoids the damaging action of high lime treatment and the high levels which are now generally employed in the processing of beet juice.

With obvious modifications the process is applied to cane juice where it serves as a simplification and improvement of the present double carbonation process.

The process may be practiced without operation of a lime kiln, if desired, relying upon the factory flue gas as a source of $CO_2$.

What I claim is:

1. In a process of purifying a sugar-containing aqueous solution, the steps comprising adding to and mixing with a sugar-containing plant juice an amount of lime not substantially exceeding 0.6% of said juice calculated as calcium oxide at elevated temperature between room temperature and a temperature not exceeding about 60° C. thereby increasing the pH-value of the resulting prelimed sugar juice to a pH between about 10.0 and about 11.0, adding to said prelimed sugar juice reactive magnesium carbonate trihydrate in an amount sufficient to adjust the pH-value of the prelimed sugar juice to a pH between about 9.6 and about 10.0, agitating the resulting mixture until substantial decolorization is effected, and removing the precipitate formed.

2. In a process of purifying a sugar-containing aqueous solution, the steps comprising adding to and mixing with a sugar-containing plant juice an amount of lime not substantially exceeding 0.6% of said juice calculated as calcium oxide at elevated temperature between room temperature and a temperature not exceeding about 60° C. thereby increasing the pH-value of the resulting prelimed sugar juice to a pH between about 10.0 and about 11.0, heating said prelimed sugar juice to a temperature of about 85° C., adding to said heated prelimed sugar juice reactive magnesium carbonate trihydrate in an amount sufficient to adjust the pH-value of the prelimed sugar juice to a pH between about 9.6 and about 10.0, agitating the resulting mixture until substantial decolorization is effected, liming said mixture to increase its pH-value to a pH between a pH exceeding about 10.0 and a pH of about 10.4 to precipitate dissolved magnesium ions as magnesium hydroxide, removing the precipitate formed, and carbonating the resulting solution to a pH-value of about 8.8.

3. In a process of purifying a sugar-containing aqueous solution, the steps comprising adding to and mixing with a sugar-containing plant juice an amount of lime not substantially exceeding 0.6% of said juice calculated as calcium oxide at elevated temperature between room temperature and a temperature not exceeding about 60° C. thereby increasing the pH-value of the resulting prelimed sugar juice to a pH of about 10.8, adding to said prelimed sugar juice reactive magnesium carbonate trihydrate in an amount sufficient to adjust the pH-value of the prelimed sugar juice to a pH between about 9.6 and about 10.0, agitating the resulting mixture until substantial decolorization is effected, liming said mixture to increase its pH-value to a pH between about 10.2 and about 10.4 to precipitate dissolved magnesium ions as magnesium hydroxide, removing the precipitate formed, and carbonating the resulting solution to a pH-value of about 8.8.

References Cited in the file of this patent

UNITED STATES PATENTS

| 1,573,603 | Grunwald | Feb. 16, 1926 |
| 2,184,570 | Teatini | Dec. 26, 1939 |
| 2,340,128 | Kent | Jan. 25, 1944 |
| 2,358,818 | Miller | Sept. 26, 1944 |
| 2,391,843 | Rawlings | Dec. 25, 1945 |
| 2,422,699 | Naugle | June 24, 1947 |
| 2,441,281 | Naugle | May 11, 1948 |
| 2,449,293 | Gloss | Sept. 14, 1948 |
| 2,477,206 | Rinehart | July 26, 1949 |
| 2,515,353 | Naugle | July 18, 1950 |

FOREIGN PATENTS

| 190 | Great Britain | of 1877 |